(12) United States Patent
Chaves et al.

(10) Patent No.: US 8,811,620 B2
(45) Date of Patent: Aug. 19, 2014

(54) SECURE SHARING OF ITEM LEVEL DATA IN THE CLOUD

(75) Inventors: Leonardo Weiss F. Chaves, Karlsruhe (DE); Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 465 days.

(21) Appl. No.: 13/026,625

(22) Filed: Feb. 14, 2011

(65) Prior Publication Data

US 2012/0210118 A1  Aug. 16, 2012

(51) Int. Cl.
*H04L 29/06* (2006.01)
*H04L 9/08* (2006.01)
*G06F 21/62* (2013.01)

(52) U.S. Cl.
CPC ......... *H04L 9/0866* (2013.01); *H04L 2209/805* (2013.01); *G06F 2221/2107* (2013.01); *G06F 21/6218* (2013.01); *H04L 63/062* (2013.01); *H04L 63/0442* (2013.01)
USPC ........... 380/282; 380/277; 380/279; 380/283; 380/44; 380/45; 713/155

(58) Field of Classification Search
USPC ......................................... 380/282
See application file for complete search history.

(56) References Cited

U.S. PATENT DOCUMENTS

| | | | |
|---|---|---|---|
| 7,225,167 B2 * | 5/2007 | Hind et al. ................. | 705/64 |
| 7,277,601 B2 * | 10/2007 | Zorab et al. ................. | 382/305 |
| 7,848,746 B2 * | 12/2010 | Juels ........................... | 455/424 |
| 8,112,626 B1 * | 2/2012 | Adler et al. ................. | 713/168 |
| 8,240,564 B2 * | 8/2012 | Grant et al. ................. | 235/385 |
| 8,310,346 B2 * | 11/2012 | Burbridge et al. .......... | 340/10.42 |
| 8,316,237 B1 * | 11/2012 | Felsher et al. .............. | 713/171 |
| 2002/0031230 A1 * | 3/2002 | Sweet et al. ................ | 380/278 |
| 2003/0023558 A1 * | 1/2003 | Menninger .................. | 705/51 |
| 2005/0010536 A1 * | 1/2005 | Cochran et al. ............ | 705/76 |
| 2005/0058292 A1 * | 3/2005 | Diorio et al. ............... | 380/270 |
| 2005/0289061 A1 * | 12/2005 | Kulakowski et al. ....... | 705/50 |
| 2007/0106892 A1 * | 5/2007 | Engberg ....................... | 713/168 |
| 2008/0199011 A1 * | 8/2008 | Tuyls et al. .................. | 380/268 |
| 2009/0292926 A1 * | 11/2009 | Daskalopoulos et al. .... | 713/176 |
| 2010/0010968 A1 * | 1/2010 | Redlich et al. .............. | 707/3 |
| 2010/0148935 A1 * | 6/2010 | Graf Von Reischach et al. ............................ | 340/10.5 |

(Continued)

OTHER PUBLICATIONS

Blass, E.O, et al, 'Tracker: Security and Privacy for RFID-based Supply Chains', 2010, EURECOM, entire document, http://eprint.iacr.org/2010/219.pdf.*

(Continued)

*Primary Examiner* — Kambiz Zand
*Assistant Examiner* — Ronald Baum
(74) *Attorney, Agent, or Firm* — Fish & Richardson P.C.

(57) ABSTRACT

Implementations of the present disclosure are directed to sharing data in a supply chain, the data corresponding to an item having a tag associated therewith. Methods include determining a random number from the tag, the random number being unique to the item, selecting a first integer and a second integer, generating a first public key based on the first integer and a semi-public key based on the second integer, generating an identifier based on the first public key and the random number, generating a key based on the semi-public key and the random number, encrypting the data using the key to provide encrypted data, defining a tuple comprising the identifier and the encrypted data, and transmitting the tuple over a network for storage in a persistent storage device.

17 Claims, 5 Drawing Sheets

(56) References Cited

U.S. PATENT DOCUMENTS

2010/0172502 A1* 7/2010 Jones et al. .................. 380/277
2011/0016318 A1* 1/2011 Syngkon et al. ............. 713/170
2011/0167010 A1* 7/2011 Soppera et al. .............. 705/318
2011/0320805 A1* 12/2011 Chaves et al. ................ 713/150

OTHER PUBLICATIONS

Abdalla et al., "Searchable Encryption Revisited: Consistency Properties, Relation to Anonymous IBE, and Extensions," In *Proceedings of CRYPTO'05*, 2005, 43 pages.
Agrawal et al., "Towards Traceability across Sovereign, Distributed RFID Databases," In *Proceedings of IDEAS'06*, 2006, 11 pages.
Beier et al., "Discovery Services—Enabling RFID Traceability in EPCglobal Networks," In *Proceedings of COMAD'06*, 2006, 4 pages.
Bellare et al., "Deterministic and efficiently searchable encryption," In *Proceedings of CRYTPO'07*, 2007, 535-552.
Boneh et al., "Public Key Encryption with Keyword Search," In *Proceedings of EUROCRYPT'04*, 2004, 15 pages.
Chaves and Kerschbaum, "Industrial Privacy in RFID-based Batch Recalls," In *Proceedings of InSPEC'08*, 2008, 7 pages.
Curtmola et al., "Searchable symmetric encryption: improved definitions and efficient constructions," in *Proceedings of ACM CCS'06*, 2006, 10 pages.
Dong et al., "Shared and Searchable Encrypted Data for Untrusted Servers," In *Proceedings of DBsec'08*, 2008, 31 pages.
Eurich et al., "The impact of perceived privacy risks on organization's willingness to share item-level event data across the supply chain," In *Electronic Commerce Research* 10(3-4), 2010, 423-440.
Fabian et al., "Security Analysis of the Object Name Service," In *Proceedings of the Int. Workshop on Security, Privacy and Trust in Pervasive and Ubiquitous Computing*, 2005, 6 pages.
Finkenzeller, "RFID Handbook: Fundamentals and Applications in Contactless Smart Cards and Identification," John Wiley & Sons, Inc., 2003, 427 pages.
Hacigumus et al., "Executing SQL over Encrypted Data in the Database-Service-Provider Model," In *Proceedings of ACM SIGMOD'02*, 2002, 12 pages.
Hore et al., "A Privacy-Preserving Index for Range Queries," In *Proceedings of VLDB'04*, 2004, 720-731.
Joux, "A One Round Protocol for Tripartite Diffie-Hellman," In *Proceedings of ANTS-IV'00*, 2000, 9 pages.
Kerschbaum and Chaves, "Secure Sharing of item-level Data in the Cloud," *IEEE 4th International Conference on Cloud Computing*, 2011, pp. 756-757.
Kerschbaum and Oertel, "Privacy-Preserving Pattern Matching for Anomaly Detection in RFID Anti-Counterfeiting," In *Proceedings RFIDsec'10*, 2010, 16 pages.
Kerschbaum et al., "Privacy-Preserving Computation of Benchmarks on Item-Level Data Using RFID," In *Proceedings ACM WISEC'10*, 2010, 6 pages.
Kerschbaum, "An Access Control Model for Mobile Physical Objects," In *Proceedings ACM SACMAT'10*, 2010, 10 pages.
Mykletun et al., "Authentication and Integrity in Outsourced Databases," In *Proceedings of NDSS'04*, 2004, 10 pages.
Plattner., "A Common Database Approach for OLTP and OLAP Using an In-Memory Column Database," In *Proceedings of Sigmod'09*, 2009, 7 pages.
Santos and Smith, "RFID in the Supply Chain: Panacea or Pandora's Box?" In *Communications of the ACM*, 2008, 51(10):127-131.
Sarma et al., "Radio frequency identification and the electronic product code," In *IEEE Micro*, 2001, 21(6):50-54.
SEC 1: Elliptic Curve Cryptography. Standards for Efficient Cryptography (SEC), Certicom Research, 2000, 98 pages.
Sion, "Strong WORM," In *Proceedings of IEEE ICDCS'08*, 2008, 8 pages.
Song et al., "Practical Techniques for Searches on Encrypted Data," In *Proceedings of IEEE Symposium on Security and Privacy*, 2000, 12 pages.
Williams et al., "Building Castles out of Mud: Practical Access Pattern Privacy and Correctness on Untrusted Storage," In *Proceedings of ACM CCS'08*, 2008, 10 pages.
Yang et al., "Multiuser private queries over encrypted databases," In *Proceedings of International Journal of Applied Cryptography*, 1(4), 2009, 12 pages.

\* cited by examiner

SECURE SHARING OF ITEM LEVEL DATA IN THE CLOUD

BACKGROUND

An enterprise uses a supply chain to transform and move a product or service from one or more suppliers (entities, partners or companies) to a customer in a manufacturing process. The supply chain is a system that can involve various organizations and people inside and outside of the enterprise. Additionally, the supply chain can utilize technologies, activities, and information to transform natural resources, raw materials and components from the one or more suppliers into a finished product that can be delivered to customer.

As the product makes its way through the supply chain, the enterprise may move the product between various suppliers. The suppliers can share product related data along the supply chain. However, the suppliers may want maintain the confidentiality of information related to the product movement and transformation as the enterprise moves the product between suppliers. This is particularly relevant in an ad hoc supply chain with dynamically changing suppliers. The enterprise can determine the trade-off between the need to share information along the supply chain and the non-proliferation of confidential information to competitors or others outside of the supply chain. Sharing information between suppliers along the supply chain can result in each supplier providing additional services that benefit the manufacture of the product. The sharing of information can also result in manufacturing process optimizations and improvements resulting in reduced manufacturing costs.

SUMMARY

Implementations of the present disclosure include methods of sharing data in a supply chain, the data corresponding to an item having a tag associated therewith. In some implementations, methods include determining a random number from the tag, the random number being unique to the item, selecting a first integer and a second integer, generating a first public key based on the first integer and a semi-public key based on the second integer, generating an identifier based on the first public key and the random number, generating a key based on the semi-public key and the random number, encrypting the data using the key to provide encrypted data, defining a tuple comprising the identifier and the encrypted data, and transmitting the tuple over a network for storage in a persistent storage device.

In some implementations, methods further include generating a value based on the semi-public key and the random number, wherein generating the encryption key is based on a pseudo-random function that maps the value to the key.

In some implementations, methods further include providing the first public key to a second party, the second party seeking access to the encrypted data. Methods further include transmitting the semi-public key to a second party, the second party seeking access to the encrypted data.

In some implementations, methods further include transmitting the random number to the second party.

In some implementations, methods further include generating a third integer, generating a second public key based on the first integer, the third integer, and the random number, and transmitting the second public key over the network for storage in the persistent storage device, the second public key used by the persistent storage device to determine the storing of the tuple.

In some implementations, a first party generates the key and transmits the key to a second party to enable the second party to access to the tuple for the item.

In some implementations, a first party generates the key and the identifier and transmits the key and the identifier to a second party to enable the second party to access to data corresponding to items that the second party possessed.

In some implementations, the first party generates the key and the identifier and transmits the key and the identifier to a second party to enable the second party to access data corresponding to items that the first party possessed.

Implementations of the present disclosure include methods of sharing data in a supply chain, the data corresponding to an item having a tag associated therewith. In some implementations, receiving at least one of a key and a semi-public key from a second party, identifying a public key associated with the second party, generating a query based on a random number, the random number being unique to the item, transmitting the query over a network to a third party, receiving, from the third party, one or more tuples identified by the third party based on the query, each tuple of the one or more tuple comprising respective encrypted data, and decrypting the encrypted data based on at least one of the key and the semi-public key.

In some implementations, methods further include determining an identifier based on the public key and a random number, the random number being unique to the item, the query including the identifier.

In some implementations, methods further include generating a value based on the random number, the query including the value.

In some implementations, the first party generates the key and transmits the key to a second party to enable the second party to access to the tuple for the item.

In some implementations, the first party generates the key and the identifier and transmits the key and the identifier to a second party to enable the second party to access to data corresponding to items that the second party possessed.

In some implementations, the first party generates the key and the identifier and transmits the key and the identifier to a second party to enable the second party to access data corresponding to items that the first party possessed.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the

DESCRIPTION OF DRAWINGS

Like reference symbols in the various drawings indicate like elements.

DETAILED DESCRIPTION

Implementations of the present disclosure are generally directed to enabling item level services through secure sharing of data within a supply chain. An enterprise may optimize their supply chain by sharing or exchanging item-level data that includes specific data regarding each item used in the manufacture of a product with other entities or companies in the supply chain that may use the same item. For example, a random number r may be encoded in a machine-readable medium, such as radio frequency identification (RFID) data, in a 2-dimensional (2D) bar code, and/or in a QR code included with the item. The random number r is associated with the particular item and can be used to uniquely identify the item and corresponding item-level data stored in a repository. In some cases, business critical information such as strategic relationships or best business practices may be inferred by the sharing of the item-level data among companies where one company has no control over the other companies that may have access to the their item-level data.

The use of item-level tracking by an enterprise for items in their supply chain may allow the enterprise to collect information regarding the item from the machine-readable medium (e.g., by scanning an RFID tag or 2D bar code for the item). The machine-readable medium can provide a sequence of elements that include a unique identifier for the item, a timestamp, and location and situation specific data for the item. The enterprise can record or store the elements in a "tuple" as item-level data in a data repository for the enterprise. In some implementations, the data repository can be located within the enterprise. In some implementations, the data repository can be located outside of the enterprise. For example, the data can be stored in a data repository provided by a cloud service provider. In these implementations, the enterprise can enforce access control to the item-level data by companies in the supply chain. Companies in the supply chain sharing data may need to gain access to data provide by multiple enterprises. In implementations including a cloud service provider, the item level data of the multiple enterprises can be stored in a central data repository provided in the cloud.

Accordingly, and in some implementations, enterprises in a supply chain can share a common database for use as a central repository for item-level data. A service provider or third party may manage the resources of the shared central repository. When using a central shared repository, the enterprise that owns the item-level data may no longer be able to control access to its data. Sharing a common database among enterprises in a supply chain can improve database query performance when an enterprise gathers item-level data for an item. However, sharing a common database may introduce security issues, as each enterprise may want to monitor and control access to the item-level data it owns for an item by other enterprises in the supply chain that do not own the data.

In some implementations, an enterprise may encrypt item-level data stored in a central repository for exchange with other enterprises in a supply chain. The encrypted item-level data may be stored in a central repository accessible by all enterprises. For example, the central repository may be cloud storage included in a cloud computing system hosted by a third party or service provider. The cloud storage service provider can manage and maintain a central repository where enterprises can store their item-level data for sharing with and access by other enterprises. Encrypting the item-level data stored in a cloud-based data repository allows the data owner to determine and enforce access control to their stored item-level data as only enterprises or other public entities that have knowledge of a private key for use in decrypting the item-level data will be able to read the item-level data stored in the cloud-based data repository. In some implementations, the service provider may not know the private key. As such, the service provider would not be able to decrypt the data and additionally would not be able to distribute the private key, intentionally or unintentionally, to any companies or other public entities thereby maintaining the confidentiality of the stored item-level data.

Sharing and exchanging of item-level data among companies in the supply chain can enable the use of various applications for analysis of the data. For example, anti-counterfeiting applications, supply chain bench marking applications and applications that identify target batch recalls can use the shared item-level data to provide information to the enterprises in the supply chain.

Figure 1:
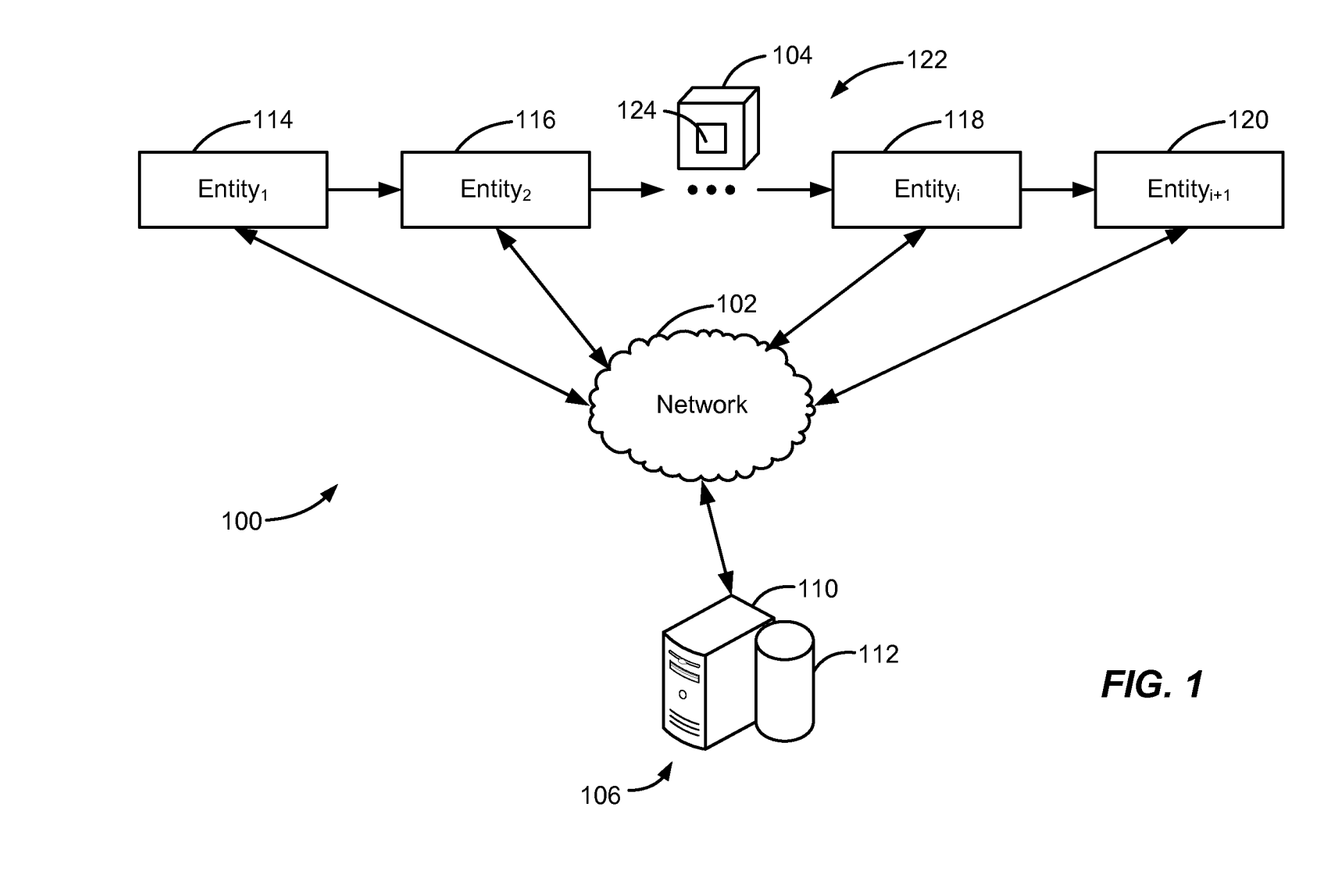
FIG. 1 is a block diagram of an example system architecture that can execute implementations of the present disclosure.

FIG. 1 is a block diagram of an example system 100 that can execute implementations of the present disclosure. The system 100 enables n number of entities (examples of which are entities 114, 116, 118, 120) access, by way of a network 102, to a central computer 106 that includes a central database 112 and a central server 110.

In the example of FIG. 1, an entity (e.g., entities 114, 116, 118, 120) can be a company, partner, organization or supplier located in a supply chain 122. For example, entity 114 is located before entity 116 in the supply chain 122. Entity 118 is located before entity 120 in the supply chain 122. The supply chain 122 manufactures item 104. The item 104 along with any additional components can be introduced to each entity in the supply chain 122 during the manufacturing process. In the example of FIG. 1, the finished item will be output by entity 120 for subsequent delivery to a customer.

The item 104 can include an attached machine-readable medium. In the illustrated example, the machine-readable medium includes an RFID tag 124. A unique identification number can be stored on the RFID tag 124 for the item 104. Each entity along the supply chain 122 can generate and associate item-level data with the item 104 as it is manufactured, or otherwise process by the respective entity. The item-level data can be associated with the item's unique identification number for storage in the central database 112.

In some implementations, the central computer 106 is located at an external service provider. Shared data among entities in the supply chain 122 can be encrypted and stored in the central database 112. Each entity in the supply chain (the n entities in the supply chain 122) can outsource the shared data to the external service provider. In addition, the external service provider can manage access to the stored shared data. For example, the central database 112 may be cloud storage and the central computer 106 may be a cloud computing system hosted by a third party or service provider. The cloud storage service provider can manage and maintain the central database 112 where the entities 114, 116, 118, 120 can store item-level data for sharing and exchanging among the entities 114, 116, 118, 120.

Each entity (e.g., entities 114, 116, 118, 120) can encrypt and store item-level data for an item used by the supply chain 122 in the manufacture of the product 104 in the central database 112. The central database 112 can include a unique identification number for each item and one or more tuples for the item where each tuple includes item-level data provided by an entity in the supply chain. In some implementations, a random number "r" included in the RFID tag (described with reference to FIG. 2) or 2D bar code for the item can be the item's identification number. The identification number can be used as an index into the database that includes all of the item-level data for the item.

Each entity in the supply chain (the n entities in the supply chain 122) can outsource their encrypted item-level data to the external service provider. The entity that owns the data can manage the access to the encrypted data by other entities as well as the service provider by using and maintaining encryption keys. This can allow entities and enterprises the ability to provide an encryption scheme related to outsourced database security and searchable encryption that can be used by multiple entities and enterprises.

Security requirements for the central database 112 can prevent a party observing the central database 112 from tracking items in the central database 112. The security requirements can prevent an attacker that continuously monitors the central database 112 from determining any information with regard to the data stored in the central database 112. In addition, the entity that owns the data (the data owner) included in the central database 112 can enforce various levels of access control to the item-level data for its items. For example, regarding item 104, the data owner can provide access control to item-level data for item 104 to another entity based on their level of trust with the other entity.

In some implementations, in a first access level (A1), a data owner can provide individual access to an entity for each tuple of item-level data stored for the item 104 in the central database 112. The first level of data access control allows the data owner to set the access level to each individual tuple of the item-level data.

In some implementations, in a second access level (A2), a data owner can provide an entity access to all tuples of item-level data for an item that the entity at one time possessed. For example, a data owner can use the second level (A2) of access control for item-level tracking. The data owner can allow or restrict the visibility of items on an item-by-item basis to other entities that at one time may have had possession of the item. This can allow one entity (e.g., the data owner) to provide item-level data access to other entities without having to set individually the access control of each tuple of the item-level data to each individual entity. For example, entities, including the data owner, may then engage in fair data sharing agreements for an item with one another without the risk of disclosing sensitive or confidential information, either directly or by inference, regarding each individual item or entity.

In some implementations, in a third access level (A3), a data owner can provide an entity access to all tuples of item-level data previously possessed by the data owner. For example, the data owner can use the third level (A3) of access control to allow trusted third parties (e.g., outsourced manufacturers, service providers or other third parties) full access to all tuples of the item-level data. In the case where the central database 112 may be cloud storage and the central computer 106 may be a cloud computing system hosted by a third party or service provider, the third access level (A3) may be used between a data owner and the service provider in order for the service provider to manage and maintain the central database 112.

Each entity can utilize cryptographic processes and algorithms to enable the secure handling of item-level data among entities. Cryptography involves the design and analysis of mathematical techniques that can enable secure communications in the presence of malicious adversaries. The use of cryptographic processes and algorithms by a data owner can prevent unwanted entities from accessing item-level data stored in a central repository. In some implementations, symmetrical encryption can involve communicating entities to agree on secret and authentic keying material for use in encrypting and decrypting data exchanged between the communicating entities. For example, symmetrical encryption can be used for each tuple of data exchanged between the communicating entities. In some implementations, asymmetrical encryption can use a public-key scheme where communicating entities exchange keying material that is authentic but not secret. Each entity selects a single key pair that includes the public key and a related private key kept secret by the entity. A key pair can be associated with each tuple of data exchanged between entities. The use of symmetrical and asymmetrical encryption, as described, assumes a key or key pair for each tuple for each entity. Entities, when sharing data, would exchange a key or key pair for each tuple of data shared. For example, a supply chain may produce millions of items utilizing hundreds of supply chain partners (entities) resulting in the use of a large number of cryptographic keys, as a cryptographic key for each tuple would be exchanged between entities for each entity.

In some implementations, and in order to reduce the number of cryptographic keys while enabling the secure handling of item-level data among entities, a cryptographic scheme can use a random number r as a unique identifier for an item along with two cryptographic keys. Communicating entities can perform a one-time exchange of cryptographic keys where new or additional items or tuples would not need an exchange of new cryptographic keys between the communicating entities. In addition, the encrypted item-level data can be stored in a central repository accessible by both trusted and untrusted entities, but protected from access by any untrusted entities and even the third party service provider.

Figure 2:
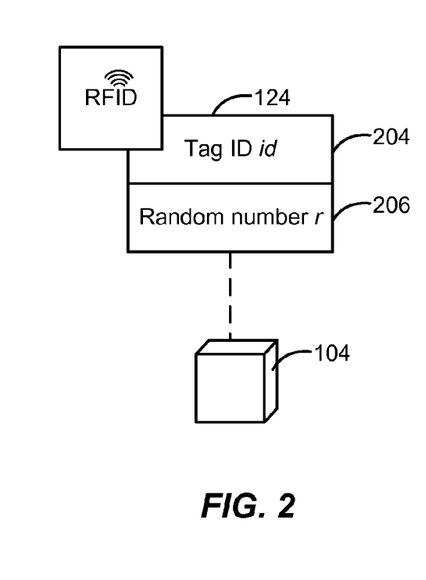
FIG. 2 is a diagram of example data that can be provided from a tag associated with an item.

FIG. 2 is a diagram of example data that can be provided from a machine-readable medium (e.g., RFID tag 124) associated with an item 104. The RFID tag 124 can include a unique tag identifier id 204 that remains unchanged throughout the supply chain. Random number r 206 can be a unique number associated with the item 104. For example, the random number r 206 can be written to the RFID tag 124 during the manufacturing process. An entity in possession of the item 104 can access and read the id 204 and the random number r 206 from the RFID tag 124. During a manufacturing process, data can be accumulated during each value added step in the supply chain. Each entity along the supply chain can store the data accumulated during the value added step performed by the entity in the supply chain as item-level data.

In some implementations, the item 104 may include alternatively or in addition a 2D barcode or other non-electronic tracking method. In these implementations, a unique identifier for the item 104 may also be a random number r associated with the item 104 and encoded in the 2D barcode.

Tuples (I, D) in a cryptographic scheme can include two values: a unique identifier, I, representative of the combination of one item with one entity, and encrypted item-level data D. The unique identifier, I, for the item can be used to locate and identify the encrypted data D within the central repository. For example, the unique identifier, I, can be used as an index to a data table of encrypted item-level data included in a database or central repository. The unique identifier, I, can be used to query for the encrypted data D, from the central repository.

Figure 3:
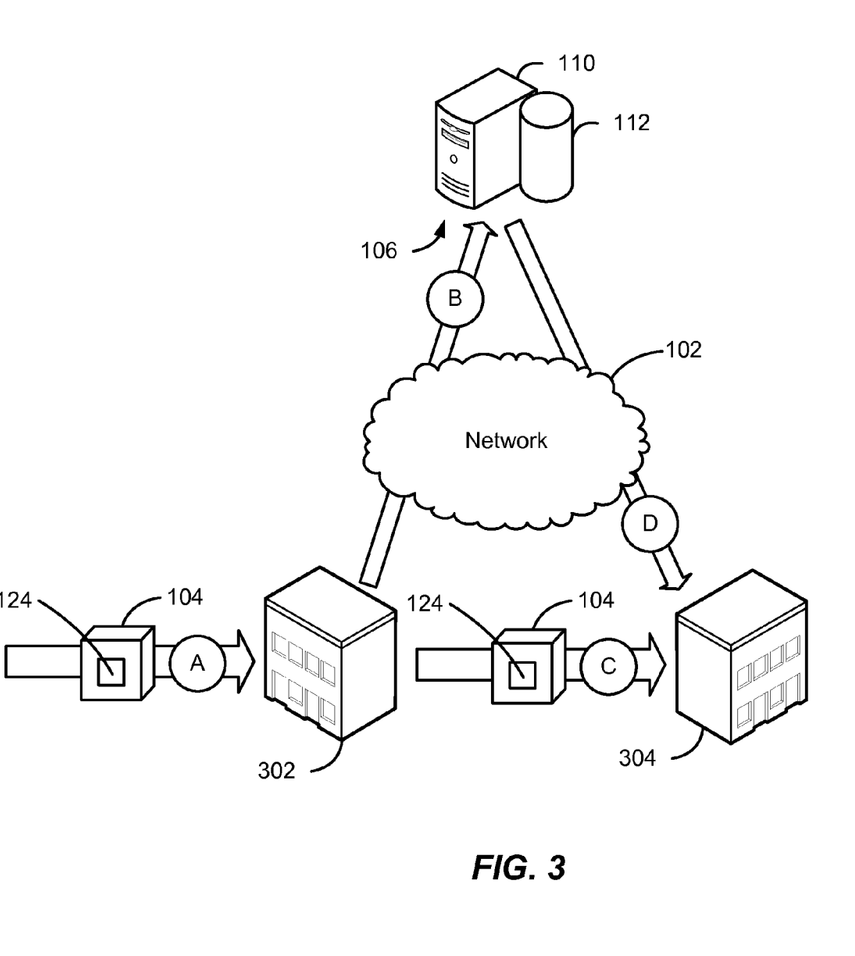
FIG. 3 is a diagram depicting example steps for secure sharing of item-level data in accordance with the present disclosure.

FIG. 3 is a diagram depicting example steps for secure sharing of item-level data in accordance with the present disclosure. For example, a company 302 receives or produces the item 104 that includes the RFID tag 124. The company 302 collects item-level data regarding the item 104 (arrow A). Company 302 encrypts the item-level data and stores it in the central database 112 of the central computer 106 (arrow B) in the form of tuples (I, D). Company 302 sells the item 104 to a company 304 (arrow C). Company 304 can query for and decrypt the item-level data stored in the central database 112 of the central computer 106 by company 302 (arrow D).

In some implementations, a cryptographic scheme can use the random number r 206 included on the RFID tag 124 for the item 104 in order to identify the item 104. Each entity that may possess the item 104 at any time can access the random number r 206, for example, by scanning the RFID tag 124. For example, g, an accumulator function, can be a generator of cyclic group $G_p$ of prime order p. The Decisional Diffie-Hellman (DDH) assumption holds true in G. The DDH assumption is a computational hardness assumption regarding a particular problem related to discrete logarithms in cyclic groups. It can be assumed that the DDH problem in $G_p$ is difficult.

For example, if given values $g$, $g^a$, $g^b$, $g^c \in G$, it is not computationally feasible to determine whether c=ab. For example, company 302 can be referred to as company i. Company i selects two private keys, $a_i$ and $b_i$, in the multiplicative group of prime integers, $Z^*_p$. Company i can use the two private keys, $a_i$ and $b_i$, to compute a public key $g^{a_i}$ and a semi-public key $g^{b_i}$. Company i collects item-level data x regarding item 104, where item 104 can be identified by random number r. Company i then computes a public key for the item 104 as $g^{a_i r}$ and a semi-public key for the item 104 as $g^{b_i r}$. A pseudo-random function (PRF) can map $G_p$ to encryption keys. For example, $E_K$ can denote encryption in a symmetrical encryption scheme using key K. Company i can then store the collected item-level data x in the central database 112 as encrypted data D using the computed keys as an index to the location in the central database 112 based on the unique identifier I where (I, D)=$(g^{a_i r}, E_{PRF(g^{b_i r})}(x))$.

Figure 4:
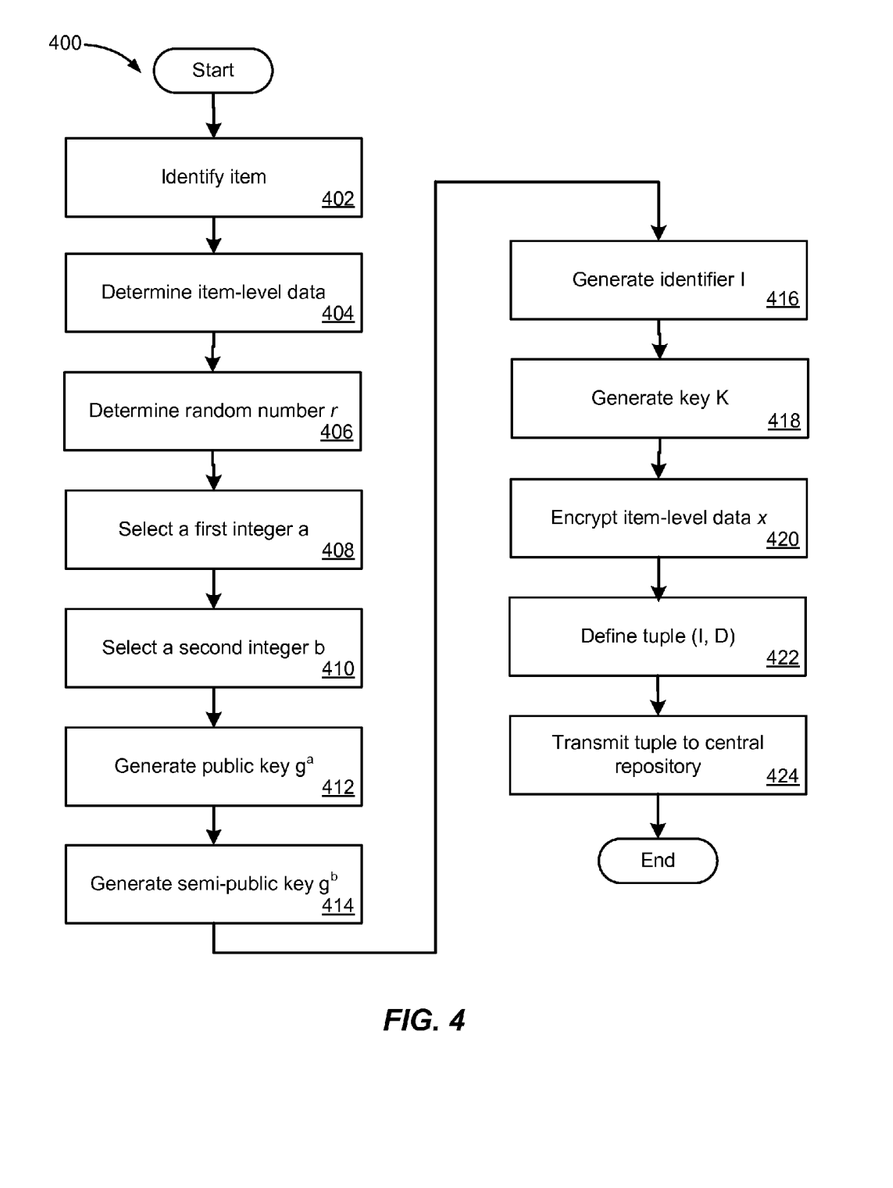
FIG. 4 is a flowchart illustrating an example process that can be executed to encrypt item-level data for storage in a central database.

FIG. 4 is a flowchart illustrating an example process 400 that can be executed to encrypt item-level data for storage in a central database. The process 400 can be described with reference to FIGS. 1, 2 and 3. The process 400 begins by identifying an item (402). For example, a company or the data owner (company 302 which can be referred to as company i) may be selling the item 104 to another company (company 304 which can be referred to as company i+1).

In preparing for the sale of the item, the data owner can identify the item 104 for sale. The item-level data x for the item is determined (404). For example, the company 302 may have the item level data x stored locally in a database and may upload the data to the central database 112 for possible future access by company 304. A random number r is determined (406). For example, company 302 scans the RFID tag 124 to determine the random number r 206 associated with the item 104. A first integer, a, is selected (408). A second integer, b, is selected (410). For example, in preparing to encrypt the item-level data x in a tuple, company 302 selects a first integer, a, and a second integer, b, where a and b are included in the multiplicative group of prime integers, $Z^*_p$. A public key, $g^a$, is generated (412). A semi-public key, $g^b$, is generated (414). For example, an accumulator function, g, can be a generator of cyclic group $G_p$ of prime order p where g, $g^a$, $g^b$, $g^c \in G$. An identifier, I, is generated (416). For example, company 302 can generate identifier I=$g^{ar}$ for the item 104. A key K is generated (418). For example, company 302 can generate a key K where $E_K$ can denote encryption in a symmetrical encryption scheme using key K and a pseudo-random function (PRF) can map $G_p$ to the encryption key K. Company 302 can generate a public key for the item 104 as $g^{ar}$ and a semi-public key for the item 104 as $g^{br}$. Item-level data is encrypted (420). For example, company 302 can encrypt the item-level data x using the key K resulting in encrypted item-level data D=$E_{PRF(g^{b_i r})}(x)$. The tuple is defined (422). For example, the tuple (I, D) is defined equal to ($g^{a_i r}$, $E_{PRF(g^{b_i r})}(x)$). The tuple is transmitted to the central repository (424). For example, company 302 transmits the tuple (I, D) to the central computer 106 for storage in the central database 112. The process 400 ends.

Referring to FIGS. 1 and 3, in order for company 304 (which can be referred to as company i+1) to access and decrypt the encrypted item-level data regarding item 104 stored by company 302 (company i) in the central database 112, company i+1 obtains access privileges from company i. Company i can grant access to the stored encrypted item level data in the central database 112 to company i+1 at one of the previously described access levels.

In some implementations, company i may grant company i+1 access to the stored encrypted item-level data for item 104 at a first access level (A1). Company i, the data owner, reveals and shares the semi-private key $g^{b_i r}$ for a specific tuple of item-level data for the item 104. Company i+1 then calculates identifier, I=$(g^{a_i})^r$ using the public key $g^{a_i}$ and the random number r associated with the item 104. Company i+1 may then query the central database 112 for the tuple (I, D) located at the index in the database using identifier I. Company i+1 can then decrypt the encrypted item-level data D in the tuple (I, D) using the semi-private key $g^{b_i r}$.

For example, referring to FIGS. 1 and 2, in order for company 304 to access the tuple (I, D) of company 302, company 304 needs to know the random number r 206 for the item 104. For example, the company 304 can determine the random number r 206 for the item 104 by scanning the RFID tag 124 on the item 104 once company 304 purchases, receives, or is otherwise in possession of the item 104 from company 302. The company 304 can determine the public key $g^{a_i r}$ for the item 104 by first determining the public key $g^{a_i}$ for the company 302 (company i).

Company 304 can obtain the public key $g^{a_i}$ for company 302 by various means. For example, company 304 may access a web site for company 302 that may provide the public key $g^{a_i}$ to download or in the form of a certificate. In another example, company 304 may obtain the public key $g^{a_i}$ by direct contact with company 302. For example, company 302 may electronically mail (email) the public key $g^a_i$ to company 304. Company 304 can use the public key $g^{a}_{i}{}^r$ as an index into the central database 112 in order to locate the encrypted item-level data $D=E_{PRF(g^b_i{}^r)}(x)$ where x is the decrypted item-level data. Company 302 can reveal to company 304 the semi-public key $g^b_i$, for example, once company 304 purchases item 104 from company 302. Company 304 can calculate the semi-private key $g^b_i{}^r$ for the item 104 by using the random number r 206 associated with the item 104. Company 304 can then calculate $E_{PRF}$ using the semi-public key $g^b_i{}^r$ in order to obtain the item-level data x.

In some implementations, company i may grant company i+1 access to the stored encrypted item-level data D for item 104 at a second access level (A2). Company i, the data owner, reveals and shares the semi-public key $g^b_i$. Company i+1 may then compute key $K=PRF((g^b_i)^r)$ and identifier $I=(g^a_i)^r$ for all tuples (I, D) for the item using the random number r associated with the item. Company i+1 may then query each tuple (I, D) located at the index in the database using the identifier I. Company i+1 can then decrypt the encrypted item-level data D using the key K for each item identified by identifier I.

In some implementations, company i may grant company i+1 access to the stored encrypted item-level data for item 104 at a third access level (A3). Company i, the data owner, reveals and shares the semi-public key $g^b_i$ and the random number r for all item-level data previously possessed by the data owner. For each item, company i+1 may then query the tuple located at the index in the database using the identifier I for each item. Company i+1 can then decrypt the encrypted item-level data D using the key K for each item identified by identifier I. For example, company i+1 may be a service provider for a cloud computing system that may manage the data stored in cloud storage included in the cloud computing system.

Figure 5:
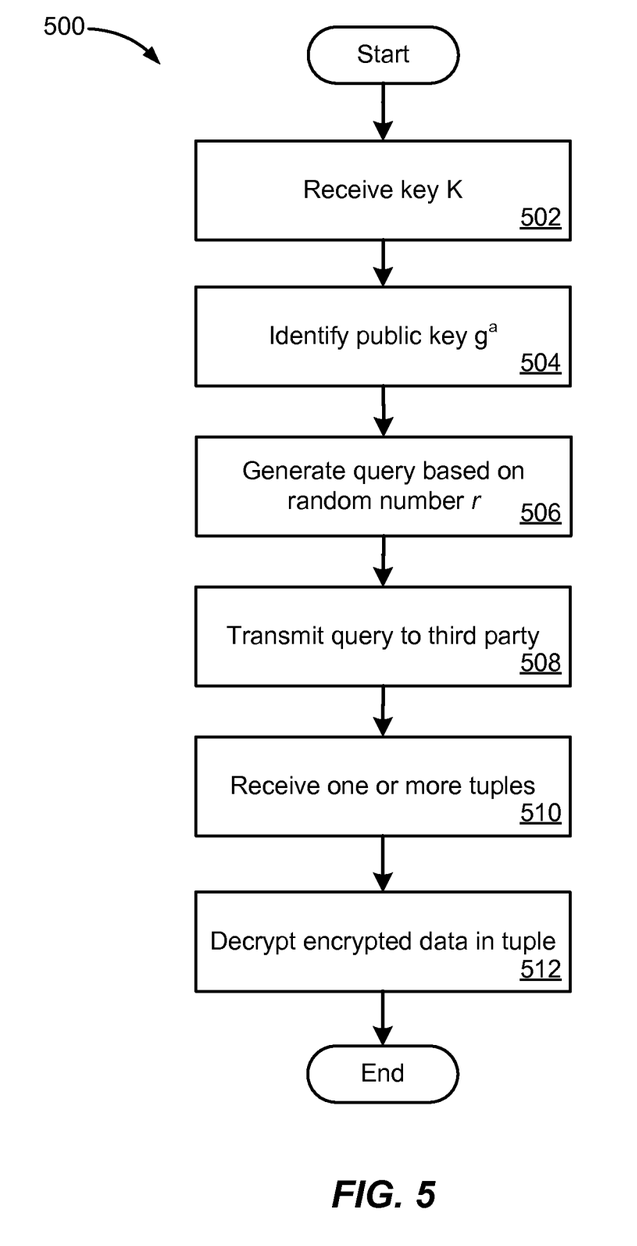
FIG. 5 is a flowchart illustrating an example process that can be executed to decrypt item-level data stored in a central database.

FIG. 5 is a flowchart illustrating an example process 500 that can be executed to decrypt item-level data stored in and retrieved from a central database. The process 500 can be described with reference to FIGS. 1, 2 and 3. The process 500 begins by receiving a key K (502). For example, a company 304, which can be referred to as company i+1, may be purchasing the item 104 from company 302, which can be referred to as company i. Company 302 can determine the access level it will grant to company 304 for the item-level data stored in the central database 112. The key provided by company 302 to company 304 can be based on the access level granted to company 304 by company 302.

A public key $g^a_i$ is identified (504). For example, company 304 can obtain the public key $g^a$ for company 302 by various means previously described. For example, if company 302 grants company 304 a first level (A1) access level, company 302 reveals a key $K=PRF((g^b)^r)$ to company 304 for the specific item 104 associated with the random number r. For example, if company 302 grants company 304 a second level (A2) access level, company 302 reveals a semi-public key $g^b$. Company 304 may then compute key $K=PRF((g^b)^r)$ and identifier $I=(g^a)^r$ for all tuples (I, D) for the item using the random number r associated with the item. A query is generated based on the random number r (506). For example, company 304 may then query each tuple (I, D) located at the index in the database using the identifier I for the item associated with the random number r. The query is transmitted to a third party (508). For example, a client-side computing device included in the company 304 can transmit the query by way of network 102 to the central computer 106. For example, the central computer 106 may be a cloud computing system that includes cloud storage. The cloud computing system may be managed by a third party or service provider. One or more tuples are received (510). For example, as a result of the query central computer 106 can return one or more tuples (e.g., tuple (I, D)) for the item. The encrypted item-level data D can be decrypted (512). For example, the company 304 can use the keys determined in the previous steps to decrypt the encrypted item-level data D included in a tuple (I, D) to determine the item-level data x. The process ends.

In some cases, an entity having access to multiple items in the central database 112 could result in the entity forging entries for the data owner for the items it can access. For example, company i+1 knowing the public and semi-private keys along with the random number r can determine the identifier I to locate the encrypted data D. As company i+1 can decrypt the item-level data, company i+1 can also encrypt item-level data and store the encrypted item-level data at the index in the central database 112 identified by the identifier I. In order to preserve the integrity of the encrypted data, company i can further maintain a private key $c_i$. For example, let h be a generator of group $G'_p$ also of prime order p. When the data owner stores the encrypted data $(E_{PRF(g^b_i{}^r)}(x))$ at the index for the identifier I $(g^a_i{}^r)$ in the central database 112, the data owner also provides the key $h^{a}_{i}{}^{c_i r}$ to the central database 112. For example, public key $h^{c_i}$ can be a public key for company i. In order to verify the integrity of the data provided by the data owner, the central database can use a bilinear map. A bilinear map is a function ê: $G \times G' \rightarrow G_T$. The bilinear map is bilinear for $g \in G$ and $h \in G'$. The function ê exhibits the following property where $ê(g^a, h^b) = ê(g, h)^{ab}$. The bilinear map is non-degenerate as ê (g, h)≠1 is a generator of $G_T$. The bilinear map is computable, as there is an efficient algorithm to compute ê (g, h) for all $g \in G$ and $h \in G'$. It may be assumed that the Symmetric External Diffie-Hellman (SXDH) assumption in G and G' holds. Examples of bilinear maps that exhibit the characteristics and properties described are Modified Weil or Tate pairings on super-singular elliptic curves. The central database 112 verifies that $ê(g^{a}_{i}{}^r, h^{c}_i) = ê(g, h^{a}_{i}{}^{c_i r})$. Once the bilinear map function is verified, the central database 112 can allow company i to write data to the database location. For example, the SXDH assumption holds as there exists a bilinear map ê: $G \times G' \rightarrow G_T$ and the DDH assumption holds in G and G'.

In order for an entity to obtain the encrypted item-level data D for a particular item of interest, the entity needs to have information regarding the item (e.g., the random number r associated with the item) in order to access the item-level data. For example, referring to FIG. 3, if the company 304 (company i+1) wants to obtain the item-level data for item 104 from the central database 112, the company 304 can first query the central database 112 for the item 104. In some implementations, the company 304 (company i+1) may not know that the company 302 (company i) possessed the item 104. The company 304 (company i+1) first queries the central database 112 to obtain the encrypted item-level data D before decrypting the item-level data D.

For example, let C be a set of all entities that may have possessed an item (e.g., all companies in a particular industry segment). Company i can generate a tuple of the form (I, $D) = (g^{a}_{i}{}^r, E_K(x))$, where company i is included in the set of all entities (i∈C) and $E_K$ can denote encryption in a symmetrical encryption scheme using key K. The company 304 (company i+1) knowing the random number r 206 associated with the item 104 (e.g., by reading the RFID tag 124) can query the central database 112 for the item-level data tuple associated with the random number r 206. The database query can be performed in a number of different ways.

In some implementations, a client-side computing device can perform calculations needed to obtain the encrypted item-level data D from a central repository. Each company included in the set of entities that may have possessed an item (i∈C) can use a public key $g^a_i$ to calculate an identifier $I=g^{a_i r}$ for the item where the random number r is associated with the item. The company can use the identifier I as an index into the central repository to retrieve the corresponding encrypted item-level data D from the central repository.

For example, referring to FIG. 3, company 304 (company i+1) can include a client-side computing device (not shown) that can communicate with the central computer 106 by way of the network 102 to obtain the encrypted item-level data D from the central database 112. The client-side computing device can use the public key $g^a_i$ to calculate the identifier $I=g^{a_i r}$ for the item associated with the random number r. The company 304 can use the calculated identifier I as an index into the central database 112 to then retrieve the corresponding encrypted item-level data D from the central database 112. The central server 110 included in the central computer 106 can use the identifier I as the index into the central database 112. The central server 110 parses all the data included in the central database 112 in order to obtain the encrypted item-level data D.

In some implementations, a server-side computing device can perform calculations needed to obtain the encrypted item-level data D from a central repository. Each company included in the set of entities that may have possessed an item (i∈C) can calculate $g^r$ as the company knows the random number r associated with the item of interest. The company can provide $g^r$ to the server-side computing device. The server-side computing device can query the central repository for all item-level data for the entities included in the set of entities C. This can be a subset of all of the data stored in the central repository. Using the public key $g^a_i$ and $g^r$ provided by the company, the server-side computing device can return the encrypted item-level data D for the case where $\hat{e}(g^r, g^a_i) = \hat{e}(g, g^{a_i r})$.

For example, referring to FIG. 3, company 304 (company i+1) can include a client-side computing device (not shown) that can communicate with the central computer 106 by way of the network 102 to obtain the encrypted item-level data D from the central database 112. The client-side computing device can calculate $g^r$ as the company knows the random number r associated with the item of interest. For example, the client-side computing device can read the RFID tag 124 for the item 104 to determine the random number r 206, where the item 104 is the item of interest. The client-side computing device included in the company 304 can provide $g^r$ to the central computer 106 by way of network 102. The central server 110 included in the central computer 106 can query the central database 112 for all item-level data for the entities included in the set of entities C. This can be a subset of all of the data stored in the central database 112. Using the public key $g^a_i$ and $g^r$ provided by the client-side computing device, the central server 110 can return the encrypted item-level data D to the client-side computing device for the case where $\hat{e}(g^r, g^a_i) = \hat{e}(g, g^{a_i r})$.

In some implementations, the identifier I of the tuple of the predecessor entity P (company i−1) and the identifier I of the tuple of the successor entity S (company i+1) can additionally be encrypted and stored in the tuple for the current entity (company i). For example, company i can store (I, D, P, S)=$(g^{a_i r}, E(x), E(g^{a_{i-1} r}), E(g^{a_{i+1} r}))$ for an item with the associated random number r using the public key $g^a_i$ and the random number r for the item. Each company included in the set of entities C (i∈C) with appropriate access rights to the data included in the central database 112 can follow the item-level data for an item of interest associated with the random number r up and down the supply chain as it transitions from one company to another. For example, the predecessor entity P (company i−1) can sell, or otherwise provide the item to the current entity (company i) that can then sell, or otherwise provide the item to the successor entity S (company i+1)). The company can then obtain the item-level data for the particular item by querying the central repository for item-level data for the item by following the item along the supply chain and accumulating the item-level data in a chaining process. Using the chaining process for obtaining item-level data can require a client-side computer included in the company performing the query to decrypt the item-level data at each step along the supply chain in order to determine the next query to perform. Using the chaining process, the server-side computing device may not need to parse all the data in the central repository in order to determine the item-level data for the particular item.

For example, referring to FIG. 3, company 304 can include a client-side computing device (not shown) that can communicate with the central computer 106 by way of the network 102 to obtain the encrypted item-level data D from the central database 112. The client-side computing device can know the random number r associated with the item of interest. For example, the client-side computing device can read the RFID tag 124 for the item 104 to determine the random number r 206, where the item 104 is the item of interest. The client-side computing device included in the company 304 can provide the random number r to the central computer 106 by way of network 102. The central server 110 included in the central computer 106 can query the central database 112 to determine (I, D, P, S)=$(g^{a_i r}, E(x), E(g^{a_{i-1} r}), E(g^{a_{i+1} r}))$ for an item with the associated random number r using the public key $g^a_i$ and the random number r for the item. The company 304 having the appropriate access rights to the encrypted item-level data D included in the central database 112 can follow the item-level data for an item of interest associated with the random number r up and down the supply chain as it transitions from one company to another. Using this process for obtaining item-level data can require a client-side computer included in the company 304 to perform the query to decrypt the item-level data at each step along the supply chain in order to determine the next query to perform. In some implementations, the company 304 may be a company along the supply chain.

In some implementations, if a company queries for tuples corresponding to one item located in cloud storage included in a cloud computing system hosted by a third party or service provider, the service provider may infer which tuples belong to the item, and thus infer the length of the supply chain. In some cases, inferring by the service provider of the length of the supply chain may be avoided by querying the tuples of many items at once or by including random tuples from other items in the query.

Each process for performing a database query to obtain the encrypted item-level data D can be beneficial dependent on system configuration and performance requirements. For example, having a client-side computing device use the public key $g^a_i$ to calculate the identifier $I=g^{a_i r}$ for the item associated with the random number r places the burden of the calculation of the identifier I on the client-side computing device. In some implementations, the client-side computing device may not perform the calculation efficiently. In addition, once the server-side computing device receives the identifier I, the server-side computing device parses the entire central repository to determine the encrypted item-level data D for the item with the identifier I. This may involve parsing data in the central repository for entities not included in the set of entities C, where (i∈C). In some implementations, the server-side computing device may provide parallelism in order to decrease the time needed to parse the central repository to determine the encrypted item-level data D for the item with the identifier I. Parallelism can involve the use of multiple processing devices in parallel to perform a certain task thereby decreasing the run time for the performance of the task (e.g., the parsing and fetching of data from a central repository). In some cases, the database included in the central repository may be replicated in order to perform parallelization where the runtime for fetching tuples may decrease by a factor of n when fetching 1/n of all tuples in parallel from n computing devices with the same data.

When using the chaining process to retrieve item-level data tuples for a particular item, the runtime of the chaining process may be dependent on the amount of time it takes the server-side computing device to fetch the identified tuples from the central repository along with the amount of time it takes the server-side computing device to decrypt the (I, D) for the tuple of the previous entity P ($g^{\alpha_i r}$, $E(g^{\alpha_{i-1} r})$) and the (I, D) for the tuple for the successor entity S ($g^{\alpha_i r}$, $E(g^{\alpha_{i+1} r})$). In addition, the amount of time it takes the server-side computing device to fetch the identified tuples and to decrypt the (I, D) for the tuples of the previous entity P and the successor entity S increases linearly with the size of the number of entities that possessed the item associated with the random number r. For each entity that possessed the item, where the entity is included in the set of all entities that possessed the item, the server-side computing device fetches one tuple from the central repository and decrypts two values: the (I, D) for the tuple of the previous entity P and the (I, D) for the tuple of the successor entity S. As described with respect to the server-side computing device parsing the database using the identifier I as an index to fetch the item-level data tuples for the item, the use of parallelization in the chaining process may not decrease the runtime needed as each step to find and fetch a tuple needs data from the previous step. Therefore, though the chaining process may parse a subset of the data included in the database (e.g., the item-level data for only one item as it moves through the supply chain), parallelization may improve the performance of the data parsing and fetching processes that parse the entire database as the computational burden can be distributed among multiple computers by replicating the database and fetching the tuples in parallel.

Figure 6:
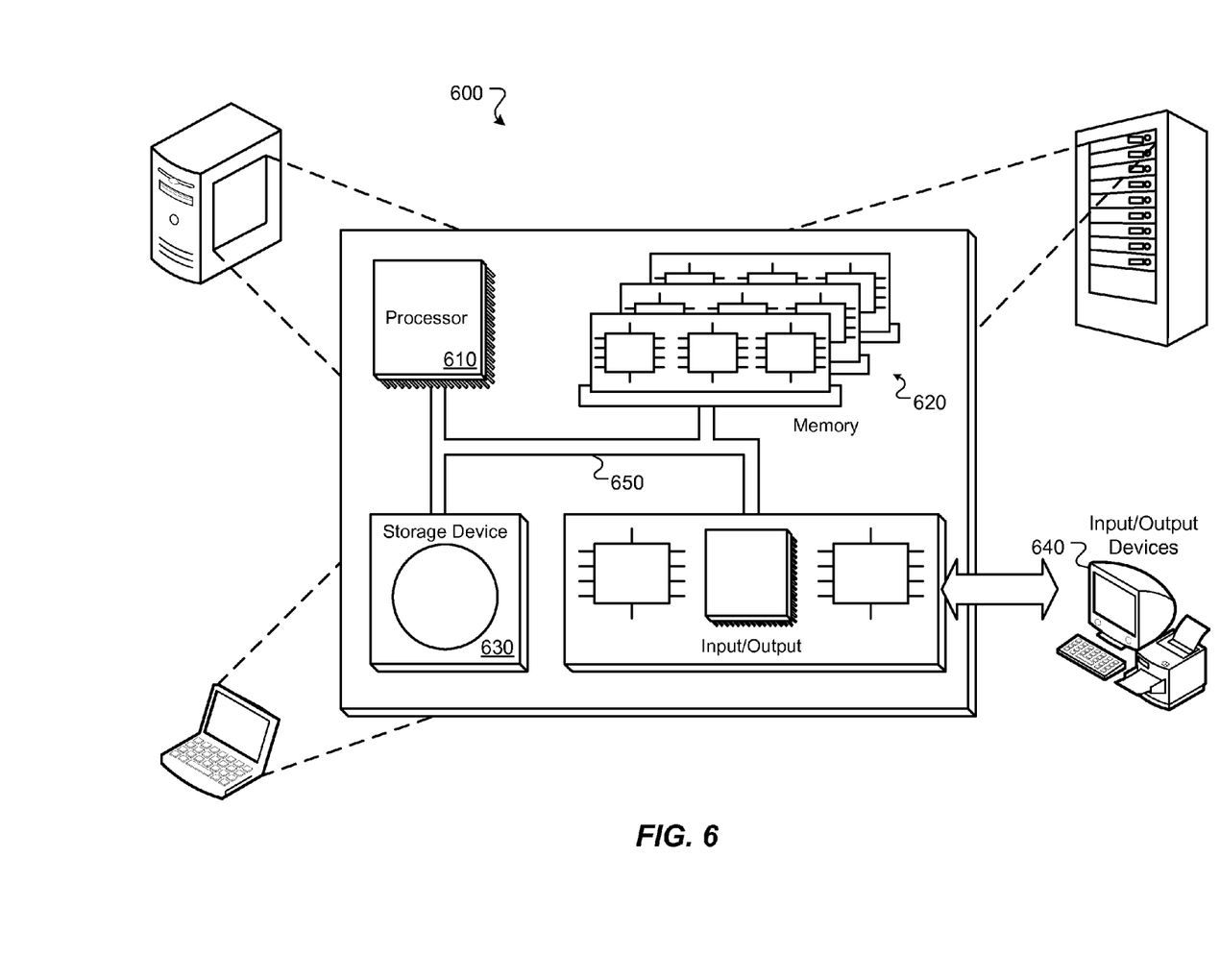
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of sharing data in a supply chain, the data corresponding to an item having a tag associated therewith, the method comprising:
   determining, by one or more processors, a random number from the tag, the random number being unique to the item;
   selecting, by the one or more processors, a first integer and a second integer from a multiplicative group of prime integers;
   generating, by the one or more processors, a first public key based on the first integer and a first key based on the second integer;
   generating, by the one or more processors, an identifier based on the first public key and the random number, the identifier being used to locate and identify encrypted data associated with the tag within a central repository of the supply chain;
   generating, by the one or more processors, a second key based on the first key and the random number;
   encrypting, by the one or more processors, the data using the second key to provide the encrypted data;
   transmitting, by the one or more processors, a tuple over a network; and
   storing the transmitted tuple in the central repository, the central repository comprising a persistent storage device, and the tuple comprising the identifier and the encrypted data and being absent from the tag.

2. The method of claim 1, further comprising generating a value based on the first key and the random number, wherein generating an encryption key is based on a pseudo-random function that maps the value to the second key.

3. The method of claim 1, further comprising providing the first public key to a second party, the second party seeking access to the encrypted data.

4. The method of claim 3, further comprising transmitting the first key to a second party, the second party seeking access to the encrypted data.

5. The method of claim 4, further comprising transmitting the random number to the second party.

6. The method of claim 1, further comprising:
   selecting from a multiplicative group of prime integers, a third integer;
   generating a second public key based on the first integer, the third integer, and the random number; and
   transmitting the second public key over the network for storing the second public key in the persistent storage device, the second public key used by the persistent storage device to determine the storing of the tuple.

7. The method of claim 1, wherein a first party generates the second key and transmits the second key to a second party to enable the second party to access to the tuple for the item.

8. The method of claim 1, wherein a first party generates the second key and the identifier and transmits the second key and the identifier to a second party to enable the second party to access to data corresponding to items that the second party possessed.

9. The method of claim 1, wherein a first party generates the second key and the identifier and transmits the second key and the identifier to a second party to enable the second party to access data corresponding to items that the first party possessed.

10. A computer-implemented method of sharing data in a supply chain, the data corresponding to an item having a tag associated therewith, the method comprising:
    receiving, by one or more processors, at least one of a first key and a second key from a second party;
    identifying, by the one or more processors, a public key associated with the second party based on the first key and the second key;
    generating, by the one or more processors, a query based on a random number, the random number being unique to the item;
    transmitting, by the one or more processors, the query over a network to a third party;
    receiving, by the one or more processors, from the third party, one or more tuples identified by the third party based on the query, each tuple of the one or more tuples being absent from the tag and comprising respective encrypted data; and
    decrypting, by the one or more processors, the encrypted data based on at least one of the first key and the second key.

11. The method of claim 10, further comprising determining an identifier based on the public key and a random number, the random number being unique to the item, the query comprising the identifier.

12. The method of claim 10, further comprising generating a value based on the random number, the query comprising the value.

13. The method of claim 10, wherein a first party generates the second key and transmits the second key to a second party to enable the second party to access to the tuple for the item.

14. The method of claim 10, wherein a first party generates the second key and the identifier and transmits the second key and the identifier to a second party to enable the second party to access to data corresponding to items that the second party possessed.

15. The method of claim 10, wherein a first party generates the second key and the identifier and transmits the second key and the identifier to a second party to enable the second party to access data corresponding to items that the first party possessed.

16. A non-transitory computer-readable storage medium coupled to one or more processors having instructions stored thereon which, when executed by the one or more processors, cause the one or more processors to perform operations for sharing data in a supply chain, the data corresponding to an item having a tag associated therewith, the operations comprising:

determining a random number from the tag, the random number being unique to the item;
selecting a first integer and a second integer from a multiplicative group of prime integers;
generating a first public key based on the first integer and a first key based on the second integer;
generating an identifier based on the first public key and the random number, the identifier being used to locate and identify encrypted data associated with the tag within a central repository of the supply chain;
generating a second key based on the first key and the random number;
encrypting the data using the second key to provide the encrypted data;
transmitting a tuple over a network; and
storing the transmitted tuple in the central repository, the central repository comprising a persistent storage device, and the tuple comprising the identifier and the encrypted data and being absent from the tag.

17. A system for sharing data in a supply chain, the data corresponding to an item having a tag associated therewith, the system comprising:
one or more computers; and
a non-transitory computer-readable medium coupled to the one or more computers having instructions stored thereon which, when executed by the one or more computers, cause the one or more computers to perform operations comprising:
determining a random number from the tag, the random number being unique to the item;
selecting from a multiplicative group of prime integers, a first integer and a second integer;
generating a first public key based on the first integer and a first key based on the second integer;
generating an identifier based on the first public key and the random number, the identifier being used to locate and identify encrypted data associated to the tag within a central repository of the supply chain;
generating a second key based on the first key and the random number;
encrypting the data using the second key to provide the encrypted data;
and
transmitting a tuple over a network;
storing the transmitted tuple in the central repository, the central repository comprising a persistent storage device, and the tuple comprising the identifier and the encrypted data and being absent from the tag.

* * * * *